United States Patent
Lim et al.

(10) Patent No.: US 12,439,169 B2
(45) Date of Patent: Oct. 7, 2025

(54) IMAGE CAPTURING METHOD FOR ACQUIRING IMAGE FRAME USING TWO OR MORE EXPOSURE VALUES, AND ELECTRONIC DEVICE THEREFOR

(71) Applicant: Samsung Electronics Co., Ltd., Suwon-si (KR)

(72) Inventors: Kwangyong Lim, Suwon-si (KR); Seongsin Kwak, Suwon-si (KR); Daesung Kim, Suwon-si (KR); Sungoh Kim, Suwon-si (KR); Dasom Lee, Suwon-si (KR); Sungdae Cho, Suwon-si (KR); Suhyung Kim, Suwon-si (KR); Daekyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 18/366,434

(22) Filed: Aug. 7, 2023

(65) Prior Publication Data
US 2023/0388657 A1 Nov. 30, 2023

Related U.S. Application Data

(63) Continuation of application No. PCT/KR2022/003276, filed on Mar. 8, 2022.

(30) Foreign Application Priority Data

Mar. 8, 2021 (KR) .................. 10-2021-0030244

(51) Int. Cl.
*H04N 23/743* (2023.01)
*G06T 7/00* (2017.01)
(Continued)

(52) U.S. Cl.
CPC ............ *H04N 23/743* (2023.01); *G06T 7/97* (2017.01); *H04N 23/12* (2023.01);
(Continued)

(58) Field of Classification Search
None
See application file for complete search history.

(56) References Cited

U.S. PATENT DOCUMENTS 8,515,206 B2  8/2013  Choe et al.
8,872,937 B2  10/2014  Matsunaga et al.
(Continued)

FOREIGN PATENT DOCUMENTS

JP  4923517 B2  2/2012
JP  6333095 B2  5/2018
(Continued)

OTHER PUBLICATIONS

International Search Report for PCT/KR2022/003276 mailed Jun. 24, 2022, 5 pages.
(Continued)

*Primary Examiner* — Quan Pham
(74) *Attorney, Agent, or Firm* — Nixon & Vanderhye, P.C.

(57) ABSTRACT

According to an embodiment of the present disclosure, disclosed is an electronic device comprising: a camera which can set a plurality of exposure values; a sensor for detecting an image capturing environment of the electronic device; and at least one processor electrically connected to the camera and the sensor, wherein the at least one processor is configured to: obtain information about the image capturing environment through the sensor; set two or more exposure values among the plurality of exposure values on the basis of the obtained information about the image capturing environment; obtain frames to which the two or
(Continued)

more set exposure values are alternately applied; and generate a video file on the basis of the obtained frames.

15 Claims, 8 Drawing Sheets

(51) Int. Cl.
  *H04N 23/12* (2023.01)
  *H04N 23/63* (2023.01)
  *H04N 23/80* (2023.01)
(52) U.S. Cl.
  CPC ........... *H04N 23/633* (2023.01); *H04N 23/80* (2023.01); *G06T 2207/10016* (2013.01); *G06T 2207/20208* (2013.01); *G06T 2207/20224* (2013.01)

(56) References Cited

U.S. PATENT DOCUMENTS

| | | | |
|---|---|---|---|
| 11,128,809 B2 | 9/2021 | Zhen et al. | |
| 11,182,887 B2 | 11/2021 | Kang et al. | |
| 2010/0183071 A1* | 7/2010 | Segall | H04N 19/33 382/167 |
| 2012/0092521 A1* | 4/2012 | Lee | H04N 9/77 348/E9.051 |
| 2014/0055638 A1 | 2/2014 | Son et al. | |
| 2015/0062410 A1 | 3/2015 | Kim et al. | |
| 2016/0205414 A1* | 7/2016 | Nomura | H04N 19/65 375/240.12 |
| 2016/0309071 A1* | 10/2016 | Vranceanu | H04N 23/741 |
| 2017/0006251 A1 | 1/2017 | Keating et al. | |
| 2017/0126987 A1* | 5/2017 | Tan | H04N 23/741 |
| 2019/0199905 A1 | 6/2019 | Choi et al. | |
| 2019/0379818 A1 | 12/2019 | Brook | |
| 2020/0068121 A1 | 2/2020 | Wang | |

FOREIGN PATENT DOCUMENTS

| | | |
|---|---|---|
| JP | 2018148353 A | 9/2018 |
| JP | 6452392 B2 | 12/2018 |
| KR | 20150089598 A | 8/2015 |
| KR | 20160127606 A | 11/2016 |
| KR | 20190075292 A | 7/2019 |
| KR | 102124604 B1 | 6/2020 |
| KR | 20200085523 A | 7/2020 |
| KR | 20200099955 A | 8/2020 |
| KR | 20210024053 A | 3/2021 |

OTHER PUBLICATIONS

Written Opinion of the ISA for PCT/KR2022/003276 mailed Jun. 24, 2022, 4 pages.
Office Action dated May 27, 2025 in Korean Application No. 10-2021-0030244 and English-language translation.

* cited by examiner

IMAGE CAPTURING METHOD FOR ACQUIRING IMAGE FRAME USING TWO OR MORE EXPOSURE VALUES, AND ELECTRONIC DEVICE THEREFOR

CROSS-REFERENCE TO RELATED APPLICATIONS

This application is a continuation of International Application No. PCT/KR2022/003276 designating the United States, filed on Mar. 8, 2022, in the Korean Intellectual Property Receiving Office and claiming priority to Korean Patent Application No. 10-2021-0030244, filed on Mar. 8, 2021, in the Korean Intellectual Property Office, the disclosures of each of which are incorporated by reference herein in their entireties.

BACKGROUND

Field

The disclosure relates to a technology for configuring an image capturing condition based on an image capturing environment in an electronic device provided with a camera capable of configuring a plurality of exposure values.

Description of Related Art

Single take refers to a camera mode in which photos and video contents are simultaneously captured and stored. Single take is a method for capturing photos and videos simultaneously for a designated short time. However, there may be a problem that, when photos and videos are simultaneously captured in the single take mode, exposure values are not adaptively changed. Accordingly, when image capturing is performed in the single take mode, there may be limitations to applying a multi-frame composition technique such as high dynamic range (HDR) to enhance image quality.

However, if an auto exposure bracketing (AEB) camera is used, frames having a plurality of different exposure values may be obtained although limited. The technique of composing a plurality of exposure images using the AEB camera is a technique of obtaining a plurality of images having different amounts of exposure and then composing images into one enhanced image using HDR.

In the prior art, various methods for extracting important moments (key-frame) from videos have been attempted. For example, there is a method of evaluating video frames with reference to aesthetics such as motion, color, or composition included in an image, storing a frame having the highest score as a photo, and recommending the stored photo to a user.

However, since this method simply extracts one frame from encoded video frames and stores as a photo, there may be a great difference from results of capturing the same scene in a photo mode in terms of quality (for example, sharpness and blurring). In addition, since the related-art method should decode an already encoded video and should extract a high-cost feature from each frame and analyze in order to detect an important section from the video, there may be a problem that many resources are required.

SUMMARY

An electronic device according to an example embodiment may include: a camera configured to configure a plurality of exposure values; a sensor configured to detect an image capturing environment of the electronic device; and at least one processor electrically connected with the camera and the sensor, wherein the at least one processor may be configured to: acquire information on the image capturing environment through the sensor, configure two or more exposure values among the plurality of exposure values based on the acquired information on the image capturing environment, acquire frames to which the two or more configured exposure values are alternately applied, and generate a video file based on the acquired frames.

A method of operating an electronic device according to an example embodiment may include: acquiring information on an image capturing environment using a sensor; configuring two or more exposure values based on the acquired information on the image capturing environment; acquiring frames to which the two or more configured exposure values are alternately applied; and generating a video file based on the acquired frames.

An electronic device according to an example embodiment may include: a camera configured to configure a plurality of exposure values; a sensor configured to detect an image capturing environment of the electronic device; and at least one processor electrically connected with the camera and the sensor, wherein the at least one processor may be configured to: acquire information on the image capturing environment through the sensor, configure two or more exposure values among the plurality of exposure values based on the acquired information on the image capturing environment, acquire frames to which the two or more configured exposure values are alternately applied, and generate a high dynamic range (HDR) image using the acquired frames.

According to the electronic device and the method according to various example embodiments of the disclosure, a photo and a video of high quality to which multi-frame composition is applied may be acquired by a single video capturing operation.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Regarding the drawings, the same or similar reference numerals may be used for the same or similar components.

DETAILED DESCRIPTION

Figure 1:
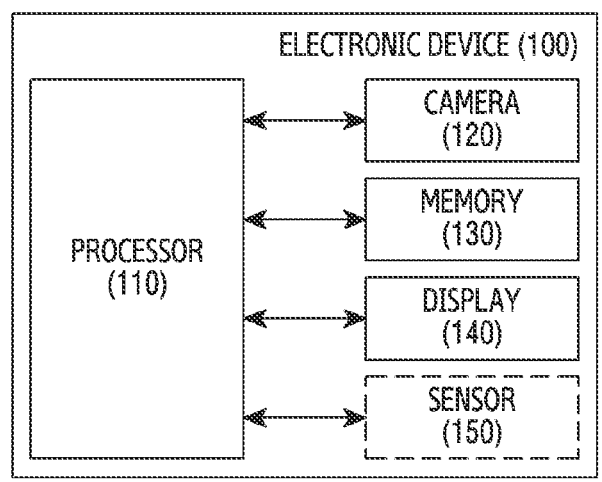
FIG. 1 is a block diagram illustrating an example configuration of an electronic device according to various embodiments.

FIG. 1 is a block diagram illustrating an example configuration of an electronic device according to various embodiments.

Referring to FIG. 1, the electronic device 100 may include a processor (e.g., including processing circuitry) 110, a camera 120, a memory 130, a display 140, and/or a sensor 150. In various embodiments, the electronic device 100 may include an additional component besides the components illustrated in FIG. 1, or may omit at least one of the components illustrated in FIG. 1.

According to an embodiment, the processor 110 may include various processing circuitry and execute computation or data processing related to control and/or communication of at least one other component of the electronic device 100 using instructions stored in the memory 130. According to an embodiment, the processor 110 may include at least one of a central processing unit (CPU), a graphics processing unit (GPU), a micro controller unit (MCU), a sensor hub, a supplementary processor, a communication processor, an application processor, an application specific integrated circuit (ASIC), field programmable gate arrays (FPGA), and may have a plurality of cores. For example, the processor 110 may include an application processor and/or an image signal processor which is operable independently from or along with the application processor.

According to an embodiment, the processor 110 may execute an application which is stored in the memory 130. According to an embodiment, the processor 110 may acquire an image (still image) and/or a moving image using the camera 120 in a state in which a first application (for example, a camera application) is executed. According to an embodiment, the processor 110 may generate a final image content or a final video content by adjusting the acquired image and/or video using a second application (for example, a single take service application).

According to an embodiment, the processor 110 may display the image acquired using the camera 120 on the display 140 as a preview image. According to an embodiment, the processor 110 may detect an image capturing environment of the electronic device 100 using the sensor 150. According to an embodiment, the processor 110 may acquire information regarding at least one of an image capturing place, ambient brightness of the electronic device 100, and the presence of a movement of the electronic device 100 using the sensor 150. According to an embodiment, the processor 110 may configure an image capturing condition such as an exposure value of the camera 120 based on the information acquired using the sensor 150. Details regarding the operations of the processor 110 will be described with reference to FIG. 4.

According to an embodiment, the camera 120 may acquire (or capture) an image (for example, a still image and/or a moving image). For example, the image signal processor (not shown) electrically connected with the camera 120 may distinguish between an object (for example, a person) and a background which are included in an image (for example, a preview image or an image stored in the memory 130). According to an embodiment, the image signal processor may be separated from the camera 120 or may be implemented as a part of the processor 110. According to an embodiment, the camera 120 may include an image sensor. According to an embodiment, the image sensor may acquire and process color information.

According to an embodiment, the sensor 150 may include at least one of a depth sensor, a time of flight (ToF) sensor, an illuminance sensor, a gyroscope sensor, and an acceleration sensor. According to an embodiment, the depth sensor may measure a depth to an external object, and may generate depth information corresponding to the external object using the measured depth. According to an embodiment, the illuminance sensor may detect brightness (for example, lux) of an ambient environment of the electronic device 100. According to an embodiment, at least part (for example, the depth sensor, the ToF sensor, or the illuminance sensor) of the sensor 150 according to an embodiment may be disposed at a distance adjacent to the camera 120 or may be formed as one module along with the camera 120. According to an embodiment, the gyroscope sensor or the acceleration sensor may detect whether there is a movement of the electronic device 100. According to an embodiment, the sensor 150 may be operably connected with at least one of the processor 110, the camera 120, and the memory 130 to process color information, 3D information, distance information or position information.

The display 140 according to an embodiment may display an image which is acquired through the camera 120. According to an embodiment, the display 140 may display the image acquired through the camera 120 as a preview image. According to an embodiment, the electronic device 100 may acquire an input of a user through the display 140 and may transmit the input of the user to the processor 110.

According to an embodiment, the memory 130 may refer to a set of one or more memories. According to an embodiment, the memory 130 may store data and/or a command which is received from or generated by other components (for example, the processor 110, the camera 120, the sensor 150, or the display 140). According to an embodiment, the memory 130 may store data which is acquired or generated by a camera application and an adjustment application.

Figure 2:
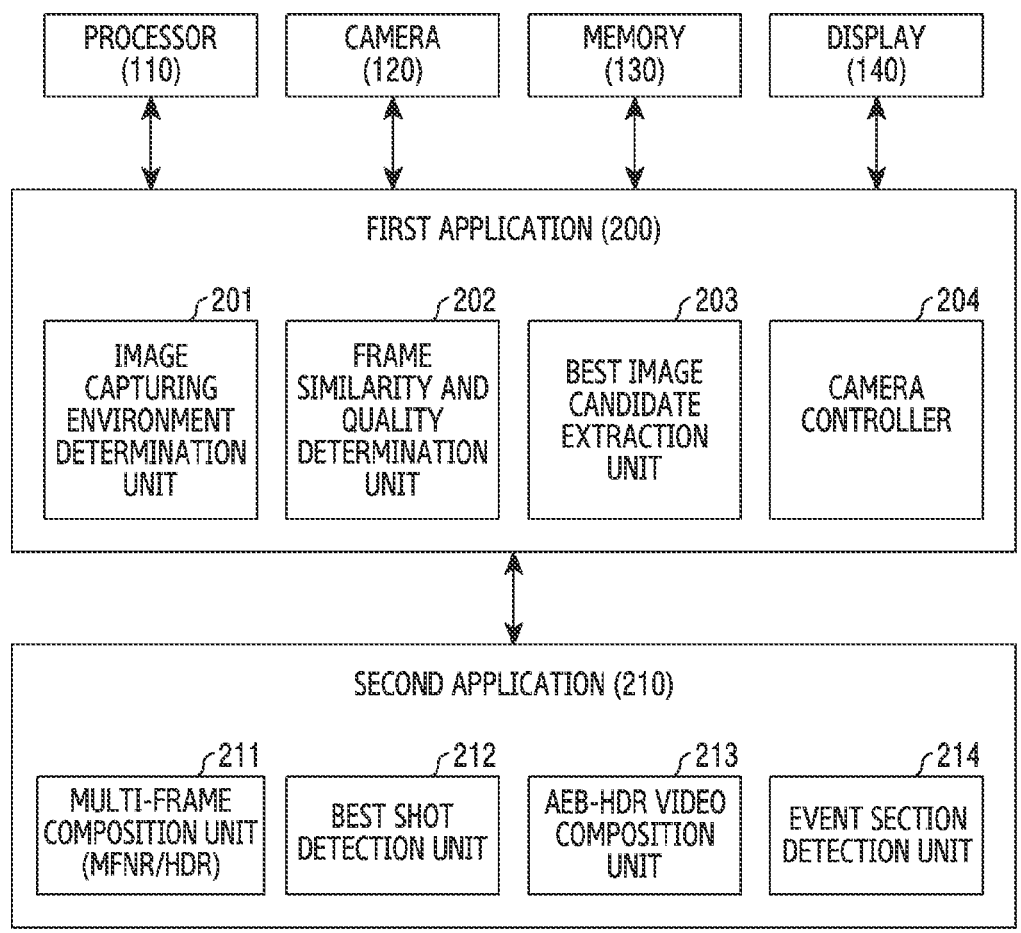
FIG. 2 is a diagram illustrating example software for capturing and adjusting in the electronic device according to various embodiments.

FIG. 2 is a diagram illustrating example software for capturing and adjusting in the electronic device according to various embodiments.

Referring to FIG. 2, a first application (for example, a camera application) 200 of the electronic device 100 according to an embodiment may include an image capturing environment determination unit 210, a frame similarity and quality determination unit 202, a best image candidate extraction unit 203, and/or a camera controller 204. A second application 210 of the electronic device 100 according to an embodiment may include a multi-frame composition unit 211, a best shot detection unit 212, an AEB-HDR video composition unit 213, and/or an event section detection unit 214. In various embodiments, the electronic device 100 may include an additional component besides the components illustrated in FIG. 2, or may omit at least one of the components illustrated in FIG. 2. The components illustrated in FIG. 2 are not necessarily implemented by physically distinguished hardware. The processor 110 of the electronic device 100 may execute instructions stored in the memory 130 in order to implement the components illustrated in FIG. 2, and may control hardware (for example, the camera 120, the display 140) associated with functions.

According to an embodiment, the image capturing environment determination unit 201 may determine a configuration value of an AEB camera, based on an image (for example, a landscape, a portrait) acquired through the camera 120 in a state in which the first application (for example, a camera application) 200 is executed, ambient brightness (illuminance), and/or information acquired through a sensor (for example, the sensor 150 of FIG. 1). For example, the configuration value may refer to an amount and a range of exposure (EV) values applied to image capturing.

According to an embodiment, the frame similarity and quality determination unit 202 may determine structural similarity and quality (sharpness and blurring) of a frame that has an exposure value of 0 among frames to which a plurality of exposure values are applied and which are received from the exposure bracketing-applied AEB camera, to a previous frame.

According to an embodiment, the best image candidate extraction unit 203 may determine whether the frame is a candidate to be extracted as a best photo, based on a result of analyzing the frames received from the AEB camera. According to an embodiment, when the frame is determined as a candidate to be extracted as a best photo, the best image candidate extraction unit 203 may store an index of the corresponding frame in a storage (for example, a photo candidate index temporary repository) so as to have the index analyzed in the second application 210.

According to an embodiment, the camera controller 204 may control overall operations of the camera 120 in the state in which the first application (for example, a camera application) 200 is executed.

According to an embodiment, the multi-frame composition unit 211 may determine the number of frames (for example, N) to be composed according to an environmental condition stored at the time that image capturing is performed, may compose N neighboring frames with reference to a frame index which is analyzed primarily by the first application 200 and is recorded on the temporary repository, and may generate a photo (or image) of high quality by applying multi-frame noise reduction (MFNR) and/or high dynamic range (HDR). According to an embodiment, when frame composition fails, the frame that is used for composition may be excluded from the best shot candidates.

According to an embodiment, the best shot detection unit 212 may evaluate photos generated by the multi-frame composition unit 211, and may extract N photos having the highest score as best shots. According to an embodiment, the best shot detection unit 212 may determine a final best shot based on evaluation of structural similarity (redundancy) between previous/next frames of the composed photos, image quality, and/or aesthetics.

According to an embodiment, the best shot detection unit 212 may calculate image hash values regarding the composed images, may analyze similarity between previous/next continuous frames (images having similar hash values) based on the hash values, and may exclude frames of high similarity from the final best shot. In another example, the best shot detection unit 212 may calculate color information based on color information from the composed images, and may evaluate similarity through semantic analysis based on the color information, or by extracting edges from the composed images and comparing edge shapes.

According to an embodiment, the best shot extraction unit 212 may exclude a similar image from the final best shot according to evaluation of redundancy of the composed images.

According to an embodiment, the best shot detection unit 212 may exclude a designated image from the final best shot according to evaluation of aesthetics of the composed images. For example, the best shot detection unit 212 may evaluate aesthetics based on at least one of: a composition score which is calculated based on composition of objects included in the image; a clarity score which is calculated based on brightness, noise, or contrast of the image; a facial expression score which is calculated based on recognition of a face of an object included in the image and detection of eyebrows, eyes, nose and/or mouth therefrom; a colorfulness score which is calculated by extracting color information from the image and based on diversity of colors; and a saturation score which is calculated based on exposure information of the image.

According to an embodiment, the AEB-HDR video composition unit 213 may generate a video of high quality by applying HDR to an image that is captured by an AEB camera in which a plurality of exposure values are configured. According to an embodiment, the AEB-HDR video composition unit 213 may use an AEB video which is captured at a high frame rate or an automatic frame rate. For example, the AEB video may refer to a video that has brightness periodically changed within an exposure value of a designated range. According to an embodiment, the AEB-HDR video composition unit 213 may generate a video that has an output of the same frames per second (FPS) as an input FPS by applying HDR to all frames.

According to an embodiment, the event section detection unit 214 may analyze a change in the energy of a video by utilizing a motion vector of a P frame in an encoding operation after HDR application. According to an embodiment, the event section detection unit 214 may detect an event section based on a result of analyzing the change in the energy of the video, and may tag the detected event information to the video.

Figure 3:
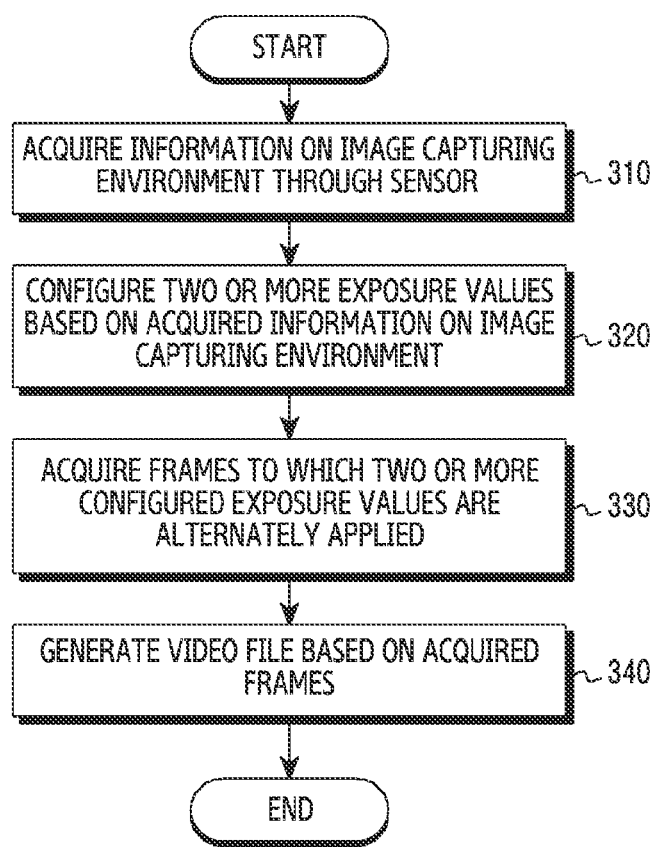
FIG. 3 is a flowchart illustrating an example operation of capturing using a plurality of exposure values in the electronic device according to various embodiments.

FIG. 3 is a flowchart illustrating an example operation of capturing using a plurality of exposure values in the electronic device according to various embodiments.

Referring to FIG. 3, the processor 110 according to an embodiment may acquire information on an image capturing environment through the sensor 150 in 310. According to an embodiment, the processor 110 may display an image which is acquired using the camera 120 on the display 140 as a preview image. According to an embodiment, the processor 110 may analyze the preview image. According to an embodiment, the processor 110 may acquire scene information based on analysis of the preview image. According to an embodiment, the processor 110 may acquire information regarding a place where the image is acquired, based on the analysis of the preview image. For example, the processor 110 may determine whether the place where the image is acquired is an indoor place or an outdoor place, based on the analysis of the preview image.

According to an embodiment, the processor 110 may use position information of the place where the current electronic device is positioned (or the place where the image is acquired), obtained through the sensor 150 (for example, a global positioning system (GPS)), complementarily to or in replacement of the above-described scene information, as information for determining whether the place is an indoor place or an outdoor place.

According to an embodiment, the processor 110 may detect an image capturing environment using the sensor 150. According to an embodiment, the processor 110 may measure brightness (for example, an exposure value (EV) unit) regarding an external object using an image sensor included in the camera 120. According to an embodiment, the processor 110 may determine ambient brightness (for example, lux) of the electronic device 100 using the illuminance sensor. According to an embodiment, the processor 110 may determine the presence of a movement of the electronic device 100 using the gyroscope sensor and/or acceleration sensor. For example, the processor 110 may determine whether a user is moving using the gyroscope sensor and/or acceleration sensor.

According to an embodiment, the processor 110 may configure two or more exposure values based on the acquired information on the image capturing environment in 320. According to an embodiment, the processor 110 may determine a range of exposure of the AEB camera based on the acquired information on the image capturing environment. According to an embodiment, the processor 110 may configure two or more exposure values within the determined range of exposure. According to an embodiment, the processor 110 may store the exposure condition (for example, the range of exposure, the exposure value) which is determined based on the information on the image capturing environment in the memory 130.

According to an embodiment, the processor 110 may acquire frames (or images) to which the two or more configured exposure values are alternately applied in 330. According to an embodiment, the processor 110 may configure a first exposure value and a second exposure value within the designated range of exposure. According to an embodiment, the processor 110 may continuously acquire a plurality of frames (or images) by applying the first exposure value and the second exposure value alternately.

According to an embodiment, the processor 110 may configure three or more exposure values within the designated range of exposure. According to an embodiment, the processor 110 may continuously acquire a plurality of images using the three or more configured exposure values in sequence and repeatedly.

According to an embodiment, the processor 110 may acquire frames to which two or more exposure values are applied for a designated image capturing time. For example, the processor 110 may finish capturing when the image capturing time designated by the user is elapsed. According to an embodiment, the processor 110 may acquire the frames to which the two or more exposure values are applied until image capturing is stopped. For example, the processor 110 may finish capturing in response to it being detected that a user's touch input on a capture button is released. In addition, for example, the processor 110 may finish capturing in response to an input corresponding to completion of capturing being received.

According to an embodiment, the processor 110 may generate a video file based on the acquired frames in 340. According to an embodiment, the processor 110 may generate a video file without compressing, based on all of the acquired frames.

Figure 4:
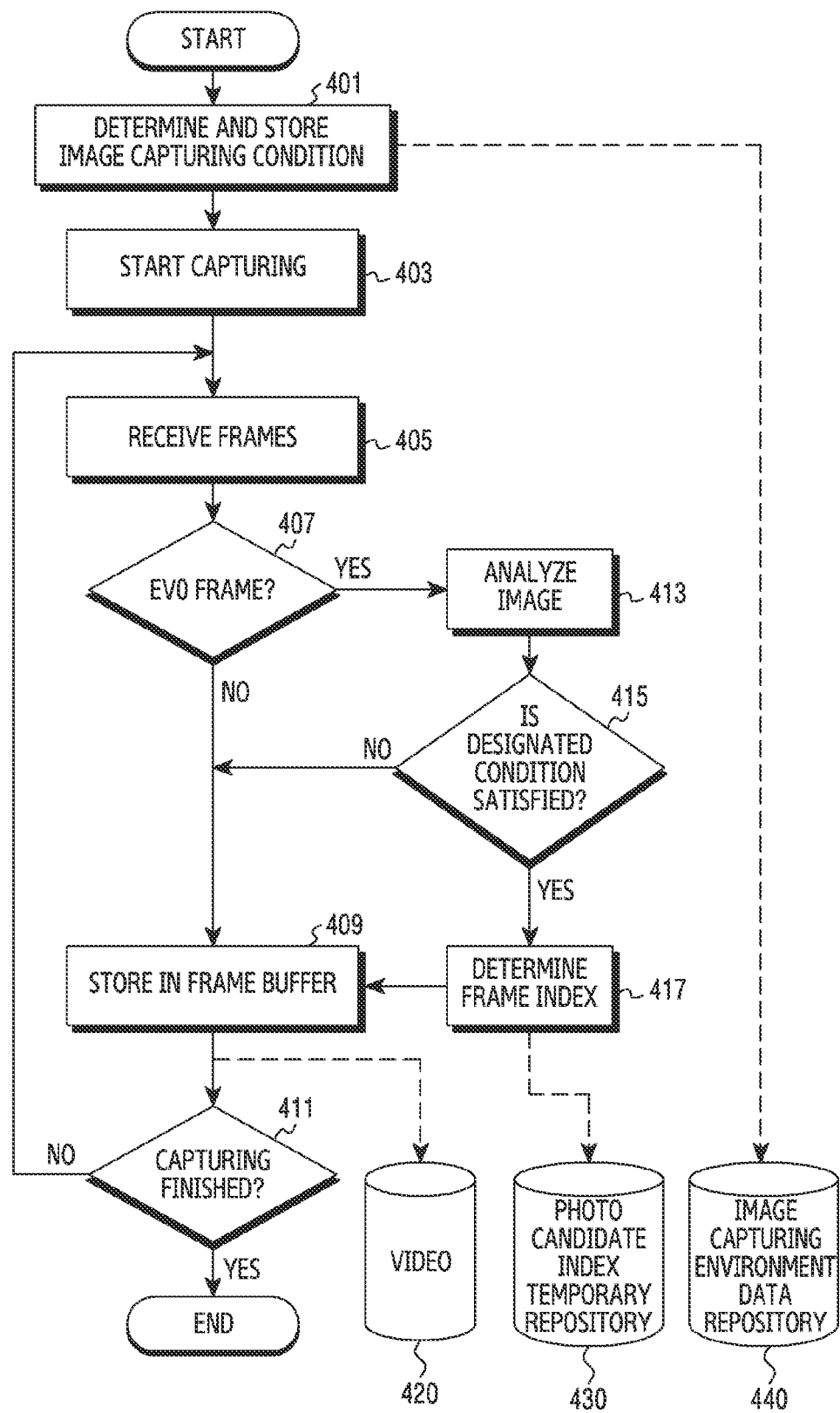
FIG. 4 is a flowchart illustrating example operations of determining and storing an image capturing condition in a first application, and capturing in the electronic device according to various embodiments.

FIG. 4 is a flowchart illustrating example operations of determining and storing an image capturing condition in a first application (for example, a camera application), and capturing in the electronic device according to various embodiments. The order of operations of FIG. 4 is an example and is not limited thereto, and may be changed or a part of the operations may be performed simultaneously or may be omitted.

Referring to FIG. 4, the processor 110 according to an embodiment may determine an image capturing condition and may store the image capturing condition in 401. According to an embodiment, the processor 110 may configure the image capturing condition based on an ambient environment which is detected using the sensor 150 in a state in which the first application (for example, the camera application) 200 is executed. According to an embodiment, the processor 110 may configure the image capturing condition, based on information on at least one of an image capturing place, ambient brightness of the electronic device 100, and the presence of a movement of the electronic device 100. For example, the image capturing condition may include at least one of a range of exposure applied to an AEB camera, two or more exposure values, and the number of frames required for composition. According to an embodiment, the processor 110 may determine image capturing parameters corresponding to the determined exposure values. For example, the image capturing parameters may include at least one of a shutter speed, an aperture value, and sensitivity.

According to an embodiment, the processor 110 may store the image capturing condition in the memory 130. For example, the processor 110 may store the image capturing condition such as the range of exposure applied to the AEB camera, the two or more exposure values, and the number of frames required for composition in an image capturing environment data repository 440.

According to an embodiment, the processor 110 may start capturing based on the determined and stored image capturing condition in 403. According to an embodiment, the processor 110 may display a preview area displaying an image acquired through the camera 120 and/or a capture button on the display 140. According to an embodiment, the processor 110 may start capturing in response to a user input on the capture button being detected. For example, the processor 110 may perform image capturing for a designated time in response to a user input (for example, a couth input) on the capture button being detected. In another example, the processor 110 may perform image capturing from a time at which a user input on the capture button is detected to a time at which it is detected that the user input on the capture button is released. In still another example, the processor 110 may perform image capturing from a time at which a user input on the capture button is detected to a time at which a user input on a button is detected.

According to an embodiment, the processor 110 may receive (or acquire) frames acquired through the camera 120 in 405. According to an embodiment, the processor 110 may receive frames using the camera 120 based on the stored image capturing condition.

According to an embodiment, the processor 110 may receive frames using two or more exposure values determined within a designated exposure range. According to an embodiment, the processor 110 may acquire a plurality of frames (or images) using the two determined exposure values alternately. According to an embodiment, the processor 110 may acquire a plurality of frames using three or more determined exposure values in sequence and repeatedly.

According to an embodiment, the processor 110 may determine whether the received frame is a frame to which an exposure value of 0 is applied in 407. According to an embodiment, the processor 110 may determine at least one frame to which the exposure value of 0 is applied among the frames to which a plurality of exposure values are applied.

According to an embodiment, when it is determined that the received frame is the frame to which the exposure value of 0 is applied ('Yes' in 407), the processor 110 may analyze the frame in 413. According to an embodiment, the processor 110 may analyze a portion that has a great difference in color in an image, like a boundary between a subject and a background where the subject is positioned, in the frame to which the exposure value of 0 is applied. According to an embodiment, the processor 110 may determine whether blurring occurs by analyzing the frame. Blurring may refer, for example, to a phenomenon in which an image of a subject captured through a lens is less clear due to a movement of the subject when the subject is captured. According to an embodiment, the processor 110 may analyze similarity of the frame to which the exposure value of 0 is applied to a previously acquired frame.

According to an embodiment, the processor 110 may determine whether the analyzed image satisfies a designated condition in 415. According to an embodiment, the processor 110 may determine whether blurring does not occur as a result of analyzing the frame to which the exposure value of 0 is applied. According to an embodiment, the processor 110 may determine whether similarity to at least one previously acquired frame is low as a result of analyzing the frame to which the exposure value of 0 is applied.

According to an embodiment, the processor 110 may determine the frame that is determined as satisfying the designated condition as an index frame in 417. According to an embodiment, when it is determined that blurring does not occur in the frame, the processor 110 may determine the frame as an index frame. According to an embodiment, when it is determined that the similarity to the at least one previously acquired frame is low, the processor 110 may determine the frame as an index frame. According to an embodiment, the processor 110 may store frames that are determined as index frames in a photo candidate index temporary repository 430.

According to an embodiment, the processor 110 may store the received frames in a frame buffer in 409. For example, the processor 110 may store, in the frame buffer, at least one frame that is not determined as the frame to which the exposure value of 0 is applied ('No' in operation 407), at least one frame that is determined as not satisfying the designated condition among the frames to which the exposure value of 0 is applied ('No' in operation 415), and/or at least one frame that is determined as an index frame. According to an embodiment, the processor 110 may generate a video file 420 based on the received frames. According to an embodiment, the video file 420 may be a video file that is stored without being compressed.

According to an embodiment, the processor 110 may determine whether image capturing is finished in 411. According to an embodiment, the processor 110 may determine that image capturing is finished when a designated time is elapsed after the user input on the capture button (for example, a touch input) is detected. In another example, the processor 110 may determine that image capturing is finished when it is detected that the user input on the capture button is released after the user input on the capture button is detected. In still another example, the processor 110 may perform image capturing until a user input corresponding to the function of finishing image capturing is detected.

According to an embodiment, when it is determined that image capturing is finished, the processor 110 may finish the above-described operations. According to an embodiment, when it is determined that image capturing is not finished, the processor 110 may resume operation 405 to receive frames acquired from the camera 120.

Figure 5A:
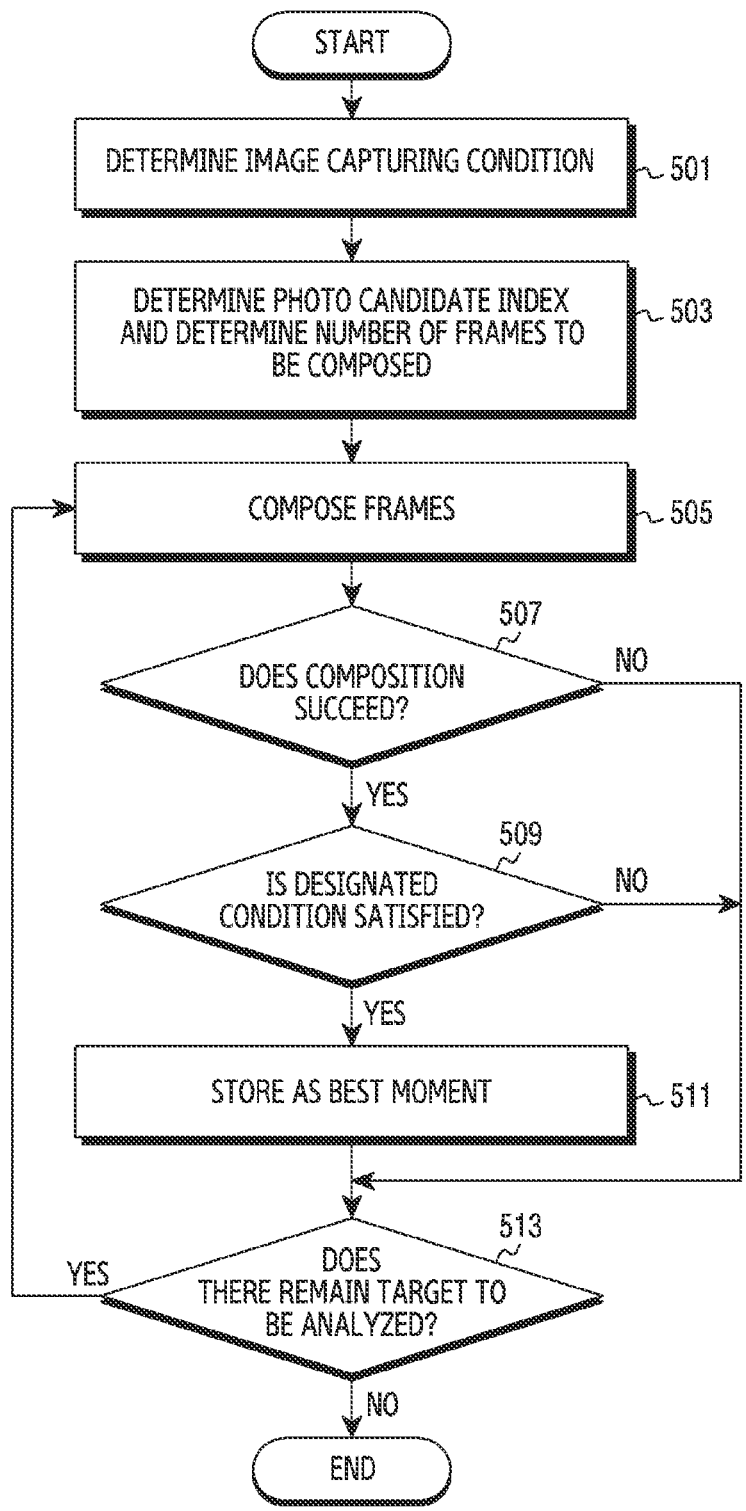
FIG. 5A is a flowchart illustrating an example operation of generating a final image content in a state in which a second application is executed in the electronic device according to various embodiments.

FIG. 5A is a flowchart illustrating an example operation of generating a final image content (for example, a best moment) in a state in which a second application (for example, a single take service application) 210 is executed in the electronic device according to various embodiments. The order of operations of FIG. 5A is an example and is not limited thereto, and may be changed or a part of the operations may be performed simultaneously or may be omitted.

Referring to FIG. 5A, the processor 110 according to an embodiment may determine an image capturing condition in 501. According to an embodiment, the processor 110 may generate a final image content by executing the second application 210 right after image capturing is completed, after a designated time is elapsed after image capturing is started, or at a designated time (for example, night time).

According to an embodiment, the processor 110 may determine an image capturing condition that is determined in the first application 200 in the state in which the second application 210 is executed. For example, the image capturing condition may include at least one of a range of exposure applied to an AEB camera, two or more exposure values, and the number of frames required for composition.

According to an embodiment, the processor 110 may determine a photo candidate index frame and the number of frames to be used for composition in 503. According to an embodiment, the processor 110 may determine the photo candidate index frame among frames stored in a photo candidate index temporary repository (for example, the photo candidate index temporary repository 430 of FIG. 4).

According to an embodiment, the processor 110 may determine the number of frames to be used for composition, based on a detected image capturing environment and/or the determined image capturing condition. According to an embodiment, the processor 110 may determine the number of frames to be used for composition, based on the image capturing environment, such as information on whether an image capturing place is an indoor place, ambient brightness of the electronic device 100, and the presence of a movement of the electronic device 100.

According to an embodiment, when it is determined that ambient brightness of the electronic device 100 is high and/or when it is determined that there is a little movement of the electronic device 100, the processor 110 may determine that the number of frames to be used for composition is a first number. In addition, when it is determined that ambient brightness of the electronic device 100 is low and/or when it is determined that there is a lot of movement of the electronic device 100, the processor 110 may determine that the number of frames to be used for composition is a second number which is larger than the first number.

According to an embodiment, the processor 110 may compose the frames in 505. According to an embodiment, when the number of frames required for composition (for example, N) is determined, the processor 110 may extract a photo candidate index frame and N continuous frames from a stored video file (for example, the video file 420 of FIG. 4). According to an embodiment, the processor 110 may acquire a composite image using the N extracted frames.

According to an embodiment, the processor 110 may determine when composition of frames succeeds in 507. For example, the processor 110 may determine whether the composite image is generated based on the N frames extracted from the video file 420.

According to an embodiment, when it is determined that composition of frames succeeds ('Yes' in 507), the processor 110 may determine whether the composite image satisfies a designated condition in 509. According to an embodiment, when it is determined that the composite image has low similarity to an image that has previously succeeded in composing, the processor 110 may determine that the designated condition is satisfied. According to an embodiment, when it is determined that aesthetics of the composite image is high, the processor 110 may determine that the designated condition is satisfied. For example, the aesthetics may be evaluated based on information on at least one of composition of a subject included in an image, a facial expression of a person included in the image, color, brightness and sharpness of the image.

According to an embodiment, when it is determined that the composite image satisfies the designated condition ('Yes' in 509), the processor 110 may store the composite image as a final image content (for example, a best moment) in 511. According to an embodiment, when it is determined that the composite image has low similarity (or redundancy) to the previous image which has succeeded in composing, the processor 110 may determine the composite image as a final image content. According to an embodiment, when it is determined that the aesthetics of the composite image is high, the processor 110 may determine the composite image as a final image content. According to an embodiment, the processor 110 may store the determined final image content in the memory 130.

According to an embodiment, the processor 110 may determine whether there remains a target to be analyzed in 513. According to an embodiment, the processor 110 may determine whether there remains a target to be analyzed among the frames acquired through the camera 120 and stored. For example, the processor 110 may determine whether there remains a target to be analyzed from the video file 420 which is stored without being compressed.

According to an embodiment, when it is determined that there does not remain the target to be analyzed ('No' in 513), the processor 110 may finish the operations. According to an embodiment, when it is determined that there remains the target to be analyzed ('Yes' in 513), the processor 110 may resume 505 to compose frames.

Figure 5B:
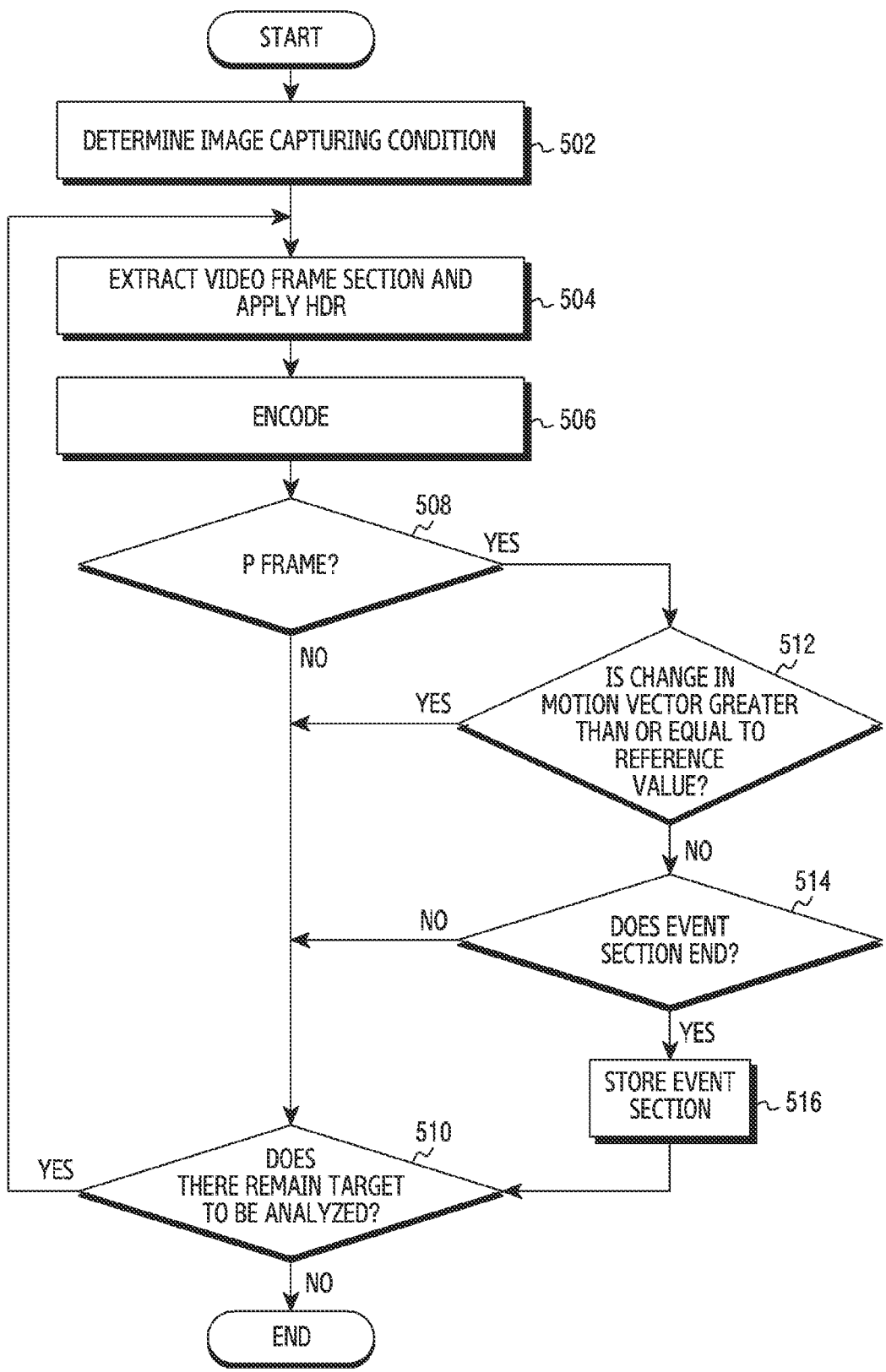
FIG. 5B is a flowchart illustrating an example operation of generating a final image content in a state in which the second application is executed in the electronic device according to various embodiments.

FIG. 5B is a flowchart illustrating an example operation of generating a final image content (for example, an event section) in the electronic device according to various embodiments. The order of operations of FIG. 5B is an example and is not limited thereto, and may be changed or a part of the operations may be performed simultaneously or may be omitted.

Referring to FIG. 5B, the processor 110 according to an embodiment may determine an image capturing condition in 502. According to an embodiment, the processor 110 may generate a final image content by executing the second application 210 after image capturing is completed, after a designated time is elapsed after image capturing is started, or at a designated time (for example, night time).

According to an embodiment, the processor 110 may determine an image capturing condition that is determined in the first application 200 in the state in which the second application 210 is executed. For example, the image capturing condition may include at least one of a range of exposure applied to an AEB camera, two or more exposure values, and the number of frames required for composition.

According to an embodiment, the processor 110 may extract a video frame section and may apply HDR in 504. According to an embodiment, the processor 110 may extract a video frame section which includes I frames in total from a video file 420. According to an embodiment, the extracted video frame section may include a video frame section in which designated exposure values are alternately applied. According to an embodiment, the processor 110 may apply multi-frame composition (for example, MFNR, HDR) to the extracted video frame section.

According to an embodiment, the processor 110 may encode the extracted video frame section in 506. According to an embodiment, the processor 110 may encode the video frame section to which the multi-frame composition is applied, and may store the video frame section in the memory 130. According to an embodiment, the processor 110 may convert the video frame section to which the multi-frame composition is applied in a designated compression method (for example, moving picture expert group (MPEG)).

According to an embodiment, the processor 110 may determine whether at least one frame included in the encoded image is a P frame in 508. For example, the processor 110 may select at least one P frame among the frames included in the image converted in the MPEG method.

According to an embodiment, the processor 110 may determine whether a change in a motion vector is greater than or equal to a reference value with respect to the selected P frames ('Yes' in 508) in 512. According to an embodiment, the processor 110 may analyze a movement of the P frame by determining whether the change in the motion vector of the P frame is greater than or equal to a threshold value.

According to an embodiment, when the change in the motion vector of the P frame is less than the reference value ('No' in 512), the processor 110 may determine whether the event section ends in 514. For example, the processor 110 may determine whether the event section ends by determining whether the change in the motion vector of the P frame is 0.

According to an embodiment, when it is determined that the event section ends ('Yes' in 514), the processor 110 may store the event section in 516. According to an embodiment, when the change in the motion vector of the P frame is 0, the processor 110 may determine that the event section ends. According to an embodiment, when it is determined that the event section ends, the processor 110 may store the event section in the memory 130 as a final image content.

According to an embodiment, information of the event section which is stored in the memory 130 as a final image content may include time information on the section in which the event occurs, scene information, length information of the section, and/or speed information. For example, the event section information may include time information regarding a time at which the change in the motion vector of the P frame is greater than or equal to the threshold value and a time at which the change in the motion vector of the P frame is less than the reference value. For example, the event section information may include scene information (for example, a scene category or a scene attribute) (for example, person's jumping) including information regarding a subject moving in the event section and/or a movement. For example, the event section information may include information of a section length from a time at which the change in the motion vector of the P frame is greater than or equal to the threshold value to a time at which the change in the motion vector of the P frame is less than the reference value. For example, the event section information may include speed information such as an average speed and/or a maximum speed of the motion vector of the P frame within the section in which the event occurs.

According to an embodiment, the processor 110 may determine whether there remains a target to be analyzed in 510. According to an embodiment, the processor 110 may determine whether there remains a target to be analyzed among the frames acquired through the camera 120 and stored. For example, the processor 110 may determine whether there remains a target to be analyzed from the video file 420 which is stored without being compressed.

According to an embodiment, when it is determined that there does not remain the target to be analyzed ('No' in 510), the processor 110 may finish the operations. According to an embodiment, when it is determined that there remains the target to be analyzed ('Yes' in 510), the processor 110 may resume 504 to extract a video frame section and apply HDR to the extracted video frame section.

Figure 6:
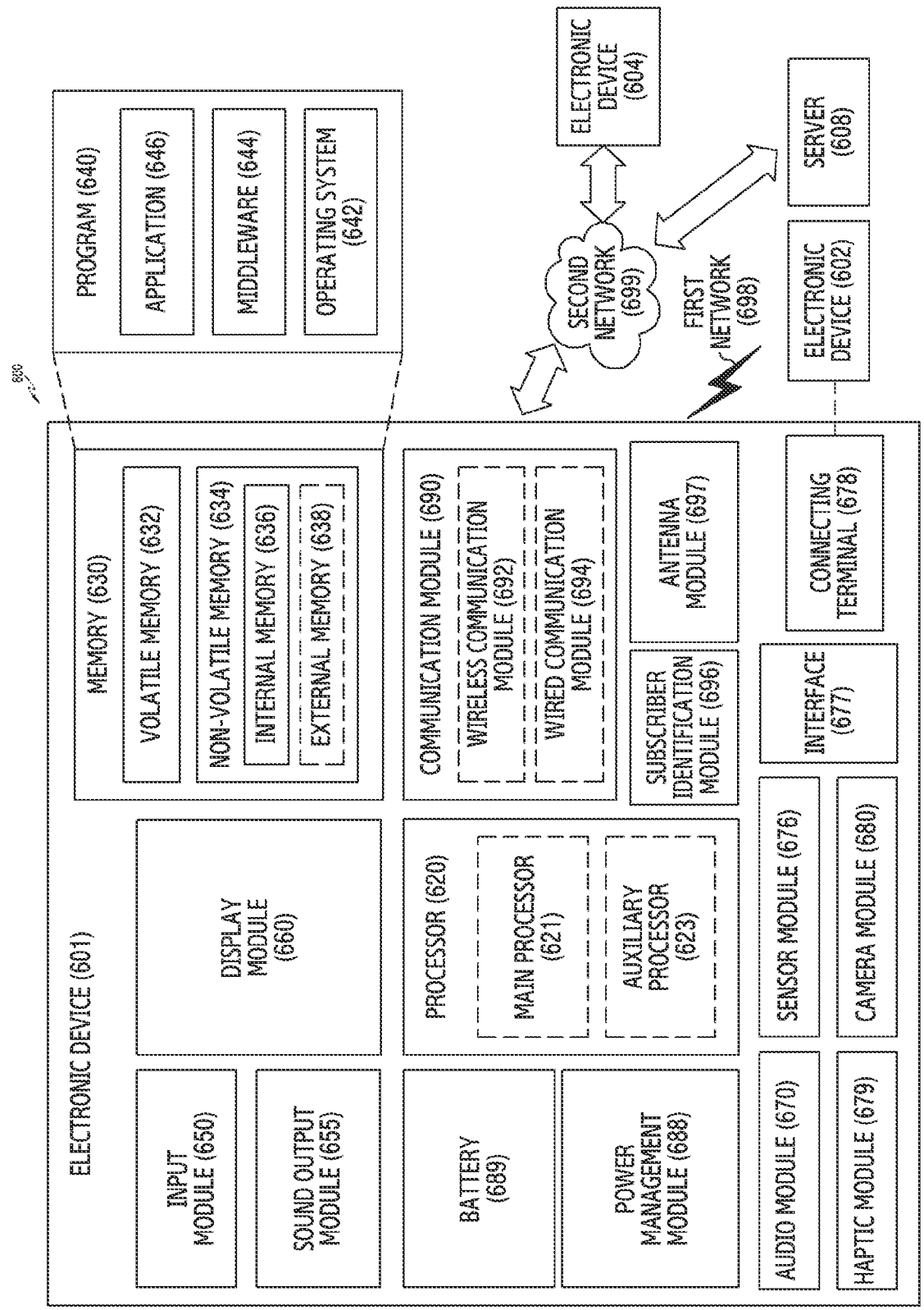
FIG. 6 is a block diagram illustrating an example electronic device in a network environment according to various embodiments.

FIG. 6 is a block diagram illustrating an example electronic device 601 in a network environment 600 according to various embodiments.

Referring to FIG. 6, the electronic device 601 in the network environment 600 may communicate with an electronic device 602 via a first network 698 (e.g., a short-range wireless communication network), or at least one of an electronic device 604 or a server 608 via a second network 699 (e.g., a long-range wireless communication network). According to an embodiment, the electronic device 601 may communicate with the electronic device 604 via the server 608. According to an embodiment, the electronic device 601 may include a processor 620, memory 630, an input module 650, a sound output module 655, a display module 660, an audio module 670, a sensor module 676, an interface 677, a connecting terminal 678, a haptic module 679, a camera module 680, a power management module 688, a battery 689, a communication module 690, a subscriber identification module (SIM) 696, or an antenna module 697. In various embodiments, at least one of the components (e.g., the connecting terminal 678) may be omitted from the electronic device 601, or one or more other components may be added in the electronic device 601. In various embodiments, some of the components (e.g., the sensor module 676, the camera module 680, or the antenna module 697) may be implemented as a single component (e.g., the display module 660).

The processor 620 may execute, for example, software (e.g., a program 640) to control at least one other component (e.g., a hardware or software component) of the electronic device 601 coupled with the processor 620, and may perform various data processing or computation. According to an embodiment, as at least part of the data processing or computation, the processor 620 may store a command or data received from another component (e.g., the sensor module 676 or the communication module 690) in volatile memory 632, process the command or the data stored in the volatile memory 632, and store resulting data in non-volatile memory 634. According to an embodiment, the processor 620 may include a main processor 621 (e.g., a central processing unit (CPU) or an application processor (AP)), or an auxiliary processor 623 (e.g., a graphics processing unit (GPU), a neural processing unit (NPU), an image signal processor (ISP), a sensor hub processor, or a communication processor (CP)) that is operable independently from, or in conjunction with, the main processor 621. For example, when the electronic device 601 includes the main processor 621 and the auxiliary processor 623, the auxiliary processor 623 may be adapted to consume less power than the main processor 621, or to be specific to a specified function. The auxiliary processor 623 may be implemented as separate from, or as part of the main processor 621.

The auxiliary processor 623 may control at least some of functions or states related to at least one component (e.g., the display module 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to an embodiment, the auxiliary processor 623 (e.g., an image signal processor or a communication processor) may be implemented as part of another component (e.g., the camera module 680 or the communication module 690) functionally related to the auxiliary processor 623. According to an embodiment, the auxiliary processor 623 (e.g., the neural processing unit) may include a hardware structure specified for artificial intelligence model processing. An artificial intelligence model may be generated by machine learning. Such learning may be performed, e.g., by the electronic device 601 where the artificial intelligence is performed or via a separate server (e.g., the server 608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input module 650 may receive a command or data to be used by another component (e.g., the processor 620) of the electronic device 601, from the outside (e.g., a user) of the electronic device 601. The input module 650 may include, for example, a microphone, a mouse, a keyboard, a key (e.g., a button), or a digital pen (e.g., a stylus pen).

The sound output module 655 may output sound signals to the outside of the electronic device 601. The sound output module 655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 660 may visually provide information to the outside (e.g., a user) of the electronic device 601. The display module 660 may include, for example, a display, a hologram device, or a projector and control circuitry to control a corresponding one of the display, hologram device, and projector. According to an embodiment, the display module 660 may include a touch sensor adapted to detect a touch, or a pressure sensor adapted to measure the intensity of force incurred by the touch.

The audio module 670 may convert a sound into an electrical signal and vice versa. According to an embodiment, the audio module 670 may obtain the sound via the input module 650, or output the sound via the sound output module 655 or a headphone of an external electronic device (e.g., an electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 602) directly (e.g., wiredly) or wirelessly. According to an embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device (e.g., the electronic device 602). According to an embodiment, the connecting terminal 678 may include, for example, a HDMI connector, a USB connector, an SD card connector, or an audio connector (e.g., a headphone connector).

The haptic module 679 may convert an electrical signal into a mechanical stimulus (e.g., a vibration or a movement) or electrical stimulus which may be recognized by a user via his tactile sensation or kinesthetic sensation. According to an embodiment, the haptic module 679 may include, for example, a motor, a piezoelectric element, or an electric stimulator.

The camera module 680 may capture a still image or moving images. According to an embodiment, the camera module 680 may include one or more lenses, image sensors, image signal processors, or flashes.

The power management module 688 may manage power supplied to the electronic device 601. According to an embodiment, the power management module 688 may be implemented as at least part of, for example, a power management integrated circuit (PMIC).

The battery 689 may supply power to at least one component of the electronic device 601. According to an embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor (AP)) and supports a direct (e.g., wired) communication or a wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or infrared data association (IrDA)) or the second network 699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The wireless communication module 692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 692 may support a high-frequency band (e.g., the mmWave band) to achieve, e.g., a high data transmission rate. The wireless communication module 692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 692 may support various requirements specified in the electronic device 601, an external electronic device (e.g., the electronic device 604), or a network system (e.g., the second network 699). According to an embodiment, the wireless communication module 692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 697 may transmit or receive a signal or power to or from the outside (e.g., the external electronic device) of the electronic device 601. According to an embodiment, the antenna module 697 may include an antenna including a radiating element including a conductive material or a conductive pattern formed in or on a substrate (e.g., a printed circuit board (PCB)). According to an embodiment, the antenna module 697 may include a plurality of antennas (e.g., array antennas). In such a case, at least one antenna appropriate for a communication scheme used in the communication network, such as the first network 698 or the second network 699, may be selected, for example, by the communication module 690 (e.g., the wireless communication module 692) from the plurality of antennas. The signal or the power may then be transmitted or received between the communication module 690 and the external electronic device via the selected at least one antenna. According to an embodiment, another component (e.g., a radio frequency integrated circuit (RFIC)) other than the radiating element may be additionally formed as part of the antenna module 697.

According to various embodiments, the antenna module 697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 604 via the server 608 coupled with the second network 699. Each of the electronic devices 602 or 604 may be a device of a same type as, or a different type, from the electronic device 601. According to an embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, mobile edge computing (MEC), or client-server computing technology may be used, for example. The electronic device 601 may provide ultra low-latency services using, e.g., distributed computing or mobile edge computing. In an embodiment, the external electronic device 604 may include an internet-of-things (IoT) device. The server 608 may be an intelligent server using machine learning and/or a neural network. According to an embodiment, the external electronic device 604 or the server 608 may be included in the second network 699. The electronic device 601 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 7:
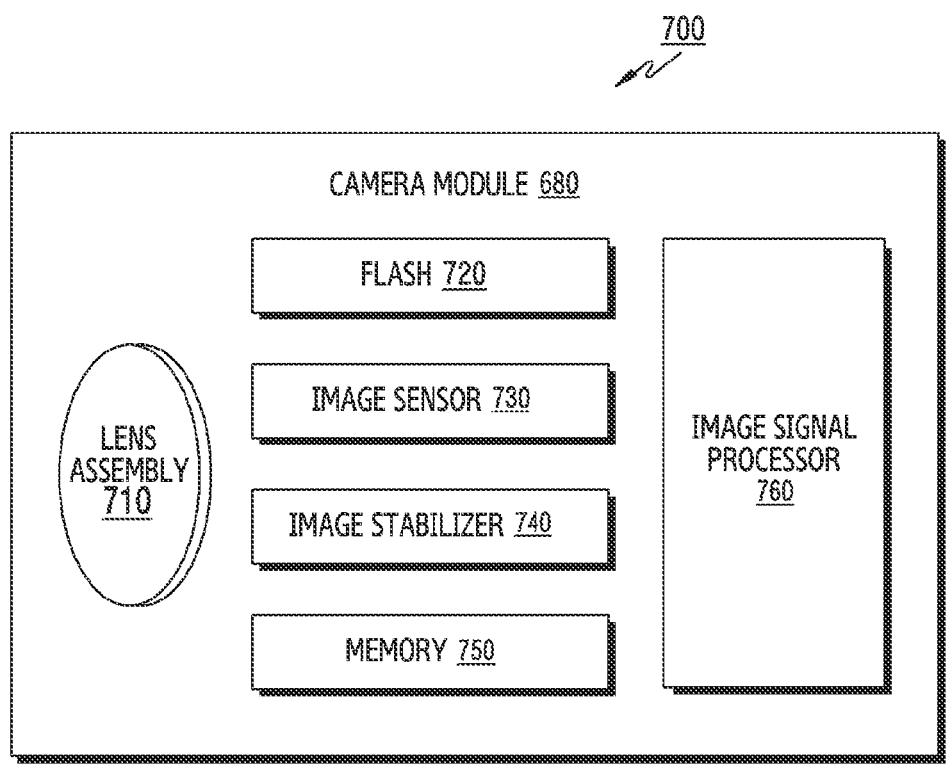
FIG. 7 is a block diagram illustrating an example configuration of a camera module according to various embodiments.

FIG. 7 is a block diagram 700 illustrating an example configuration of a camera module 680 according to various embodiments. Referring to FIG. 7, the camera module 680 may include a lens assembly (e.g., including at least one lens) 710, a flash 720, an image sensor 730, an image stabilizer (e.g., including stabilization circuitry) 740, a memory 750 (for example, a buffer memory), and/or an image signal processor (e.g., including processing circuitry) 760. The lens assembly 710 may collect light emitted from a subject which is a target object for capturing an image. The lens assembly 710 may include one or more lenses. According to an embodiment, the camera module 680 may include a plurality of lens assemblies 710. In this case, the camera module 680 may include, for example, a dual camera, a 360-degree camera, or a spherical camera. Some of the plurality of lens assemblies 710 may have the same lens attribute (for example, a view angle, a focal distance, auto focusing, f number, or optical zoom), or at least one lens assembly may have one or more lens attributes different from lens attributes of other lens assemblies. The lens assembly 710 may include, for example, a wide angle lens or a telephoto lens.

The flash 720 may emit light which is used to strengthen the light emitted or reflected from the subject. According to an embodiment, the flash 720 may include one or more light emitting diodes (LEDs) (for example, red-green-blue (RGB) LED, white LED, infrared LED, or ultraviolet LED), or a xenon lamp. The image sensor 730 may obtain an image corresponding to the subject, by converting light emitted or reflected from the subject and transmitted through the lens assembly 710 into an electrical signal. According to an embodiment, the image sensor 730 may include, for example, one image sensor selected from image sensors having different attributes, such as an RGB sensor, a black and white (BW) sensor, an IR sensor, or a UV sensor, a plurality of image sensors having the same attribute, or a plurality of image sensors having different attributes. The respective image sensors included in the image sensor 730 may be implemented using, for example, a charged coupled device (CCD) sensor or a complementary metal oxide semiconductor (CMOS) sensor.

The image stabilizer 740 may include various circuitry and shift at least one lens included in the lens assembly 710, or the image sensor 730 in a specific direction, or may control operating characteristics of the image sensor 730 (for example, adjusting a read-out timing), in response to a movement of the camera module 680 or the electronic device 601 including the same. This may compensate for at least part of a negative influence on a captured image by the movement. According to an embodiment, the image stabilizer 740 may detect such a movement of the camera module 680 or the electronic device 601 using a gyroscope sensor (not shown) or an acceleration sensor (not shown) disposed inside or outside the camera module 680. According to an embodiment, the image stabilizer 740 may be implemented by an optical image stabilizer, for example.

The memory 750 may at least temporarily store at least part of an image obtained through the image sensor 730 for the next image processing operation. For example, when image acquisition is delayed due to a shutter or when a plurality of images are obtained at high speed, the obtained original image (for example, a Bayer-patterned image or an image of a high resolution) may be stored in the memory 750, and a copy image corresponding thereto (for example, an image of a low resolution) may be previewed through the display module 660. Thereafter, when a designated condition is satisfied (for example, a user input or a system command), at least part of the original image stored in the memory 750 may be obtained and processed by the image signal processor 760, for example. According to an embodiment, the memory 750 may be configured as at least part of the memory 630 or as a separate memory operated independently therefrom.

The image signal processor 760 may include various processing circuitry and perform one or more image processing operations with respect to an image that is obtained through the image sensor 730 or an image that is stored in the memory 750. The one or more image processing operations may include, for example, depth map generation, 3-dimensional modeling, panorama generation, feature point extraction, image synthesis, or image compensation (for example, noise reduction, resolution adjustment, brightness adjustment, blurring, sharpening, or softening). Additionally or alternatively, the image signal processor 760 may perform control (for example, control of exposure time or control of read-out timing) for at least one (for example, the image sensor 730) of the components included in the camera module 680. An image processed by the image signal processor 760 may be stored in the memory 750 again or may be provided to an external component (for example, the memory 630, the display module 660, the electronic device 602, the electronic device 604, or the server 608) of the camera module 680 to be additionally processed. According to an embodiment, the image signal processor 760 may be configured as at least part of the processor 620 or may be configured as a separate processor operated independently from the processor 620. When the image signal processor 760 is configured as a separate processor from the processor 620, at least one image processed by the image signal processor 760 may be displayed through the display module device 660 as it is by the processor 620 or after undergoing additional image processing.

According to an embodiment, the electronic device 601 may include a plurality of camera modules 680 having different attributes or functions. In this case, for example, at least one of the plurality of camera modules 680 may be a wide angle camera and at least one other camera module may be a telephoto lens camera. Similarly, at least one of the plurality of camera modules 680 may be a front-facing camera and at least one other camera module may be a rear-facing camera.

As described above, an electronic device (for example, the electronic device 100 of FIG. 1) according to an example embodiment may include: a camera (for example, the camera 120 of FIG. 1) configured to configure a plurality of exposure values; a sensor (for example, the sensor 150 of FIG. 1) configured to detect an image capturing environment of the electronic device; and at least one processor (for example, the processor 110 of FIG. 1) electrically connected with the camera and the sensor, and the at least one processor may be configured to: acquire information on the image capturing environment through the sensor, configure two or more exposure values among the plurality of exposure values based on the acquired information on the image capturing environment, acquire frames to which the two or more configured exposure values are alternately applied, and generate a video file based on the acquired frames.

According to an example embodiment, the at least one processor may be configured to detect the image capturing environment using at least one of an illuminance sensor, a gyroscope sensor, and an acceleration sensor.

According to an example embodiment, the information on the image capturing environment may include information on at least one of an image capturing place, ambient brightness of the electronic device, and the presence of a movement of the electronic device.

According to an example embodiment, the at least one processor may be configured to determine at least one frame determined as satisfying a designated condition among the acquired frames as an index frame.

According to an example embodiment, the at least one processor may be configured to determine a frame sharpness greater than or equal to a threshold value and a frame similarity of which to a previously acquired frame is less than a threshold value among the acquired frames as satisfying the designated condition.

According to an example embodiment, the at least one processor may be configured to: determine a number of frames to be used for composition among the acquired frames, based on the information on the image capturing environment, extract the index frame and the determined number of continuous frames from the generated video file, and acquire a composite image using the extracted frames.

According to an example embodiment, the at least one processor may be configured to: analyze at least one of composition, color, brightness of the composite image, and similarity to a previously acquired composite image, and generate a final image content based on the analysis.

According to an example embodiment, the at least one processor may be configured to acquire the composite image based on image capturing being completed, based on a designated time being elapsed based on image capturing being started, or based on the electronic device being in a sleep mode.

As described above, a method of operating an electronic device (for example, the electronic device 100 of FIG. 1) according to an example embodiment may include: acquiring information on an image capturing environment using a sensor; configuring two or more exposure values based on the acquired information on the image capturing environment; acquiring frames to which the two or more configured exposure values are alternately applied; and generating a video file based on the acquired frames.

According to an example embodiment, acquiring the information on the image capturing environment may include detecting the image capturing environment using at least one of an illuminance sensor, a gyroscope sensor, and an acceleration sensor.

According to an example embodiment, the information on the image capturing environment may include information on at least one of an image capturing place, ambient brightness of the electronic device, and the presence of a movement of the electronic device.

According to an example embodiment, the method of operating the electronic device may further include determining at least one frame determined as satisfying a designated condition among the acquired frames as an index frame.

According to an example embodiment, the method of operating the electronic device may further include determining a frame sharpness greater than or equal to a threshold value and a frame similarity of a previously acquired frame is less than a threshold value among the acquired frames as satisfying the designated condition.

According to an example embodiment, the method of operating the electronic device may further include: determining a number of frames to be used for composition among the acquired frames, based on the information on the image capturing environment; extracting the index frame and the determined number of continuous frames from the generated video file; and acquiring a composite image using the extracted frames.

According to an example embodiment, the method of operating the electronic device may further include analyzing at least one of composition, color, brightness of the composite image, and similarity to a previously acquired composite image, and generating a final image content based on the analysis.

As described above, an electronic device (for example, the electronic device 100 of FIG. 1) according to an example embodiment may include: a camera (for example, the camera 120 of FIG. 1) configured to configure a plurality of exposure values; a sensor (for example, the sensor 150 of FIG. 1) configured to detect an image capturing environment of the electronic device; and at least one processor (for example, the processor 110 of FIG. 1) electrically connected with the camera and the sensor, and the at least one processor may be configured to: acquire information on the image capturing environment through the sensor, configure two or more exposure values among the plurality of exposure values based on the acquired information on the image capturing environment, acquire frames to which the two or more configured exposure values are alternately applied, and generate a high dynamic range (HDR) image using the acquired frames.

According to an example embodiment, the at least one processor may be configured to detect the image capturing environment using at least one of an illuminance sensor, a gyroscope sensor, and an acceleration sensor.

According to an example embodiment, the information on the image capturing environment may include information on at least one of an image capturing place, ambient brightness of the electronic device, and the presence of a movement of the electronic device.

According to an example embodiment, the at least one processor may be configured to: select a plurality of P frames from the generated HDR image, analyze movements of the P frames, and generate a final image content based on the analysis.

According to an example embodiment, the at least one processor may be configured to analyze the movements of the P frames by determining whether a change in a motion vector of the P frames is less than a threshold value and whether the change in the motion vector is 0.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a camera configured to configure a plurality of exposure values;
a sensor configured to detect an image capturing environment of the electronic device;
memory storing instructions, a first application, and a second application, and
at least one processor electrically connected with the camera and the sensor,
wherein the instructions, when being executed by the at least one processor, cause the electronic device to:
while the first application is executed:
acquire information on the image capturing environment through the sensor,
configure two or more exposure values among the plurality of exposure values based on the acquired information on the image capturing environment,
acquire frames to which the two or more configured exposure values are alternately applied,
generate an uncompressed video file based on the acquired frames, and
store the uncompressed video file, at least one index, and the information on the image capturing environment, wherein the at least one index indicates at least one index frame determined at least partially based on an exposure value from the acquired frames; and
while the second application is executed:
determine a first frame from among the at least one index frame indicated by the at least one index,
determine at least one second frame from the uncompressed video file based on the information on the image capturing environment, and
acquire a composite image by composing the first frame and the at least one second frame.

2. The electronic device of claim 1, wherein the instructions, when being executed by the at least one processor, cause the electronic device to detect the image capturing environment using at least one of an illuminance sensor, a gyroscope sensor, or an acceleration sensor.

3. The electronic device of claim 1, wherein the information on the image capturing environment comprises information on at least one of an image capturing place, ambient brightness of an environment of the electronic device, or movement of the electronic device.

4. The electronic device of claim 1, wherein the instructions, when being executed by the at least one processor, cause the electronic device to determine, as the at least one index frame, at least one frame determined as satisfying a designated condition from among the acquired frames.

5. The electronic device of claim 4, wherein the instructions, when being executed by the at least one processor, cause the electronic device to determine, as satisfying the designated condition, a frame sharpness greater than or equal to a threshold value or a frame similarity to a previously acquired frame among the acquired frames less than a threshold value.

6. The electronic device of claim 4, wherein the instructions, when being executed by the at least one processor, cause the electronic device to:
determine a number of frames among the acquired frames to be used for the composition, based on the information on the image capturing environment;
based on the determined number, extract the first frame and at least one continuous second frames from the uncompressed video file; and
acquire the composite image using the extracted frames.

7. The electronic device of claim 6, wherein the instructions, when being executed by the at least one processor, cause the electronic device to analyze at least one of composition, color, brightness of the composite image, or similarity to a previously acquired composite image, and generate a final image content based on the analysis.

8. The electronic device of claim 6, wherein the instructions, when being executed by the at least one processor, cause the electronic device to acquire the composite image based on image capturing being completed, based on a designated time being elapsed after image capturing is started, or based on the electronic device being in a sleep mode.

9. A method of operating an electronic device, the method comprising:
while the electronic device executes a first application:
acquiring information on an image capturing environment using a sensor,
configuring two or more exposure values based on the acquired information on the image capturing environment,
acquiring frames to which the two or more configured exposure values are alternately applied,
generating an uncompressed video file based on the acquired frames, and
storing the uncompressed video file, at least one index, and the information on the image capturing environment, wherein the at least one index indicates at least one index frame determined at least partially based on an exposure value from the acquired frames; and
while the electronic device executes a second application:
determining a first frame from the at least one index frame indicated by the at least one index,
determining at least one second frame from the uncompressed video file based on the information on the image capturing environment, and
acquiring a composite image by composing the first frame and the at least one second frame.

10. The method of claim 9, wherein acquiring the information on the image capturing environment comprises detecting the image capturing environment using at least one of an illuminance sensor, a gyroscope sensor, or an acceleration sensor.

11. The method of claim 9, wherein the information on the image capturing environment comprises information on at least one of an image capturing place, ambient brightness of an environment of the electronic device, or movement of the electronic device.

12. The method of claim 9, further comprising determining, as the at least one index frame, at least one frame determined as satisfying a designated condition from among the acquired frames.

13. The method of claim 12, further comprising determining, as satisfying the designated condition, a frame sharpness greater than or equal to a threshold value or a frame similarity to a previously acquired frame from among the acquired frames less than a threshold value.

14. The method of claim 12, further comprising:
determining a number of frames among the acquired frames to be used for the composition, based on the information on the image capturing environment;

based on the determined number, extracting the first frame and a least one continuous second frame from the generated video file; and acquiring the composite image using the extracted frames.

15. The method of claim 14, further comprising:

analyzing at least one of composition, color, brightness of the composite image, or similarity to a previously acquired composite image, and generating a final image content based on the analysis.

* * * * *